UNITED STATES PATENT OFFICE.

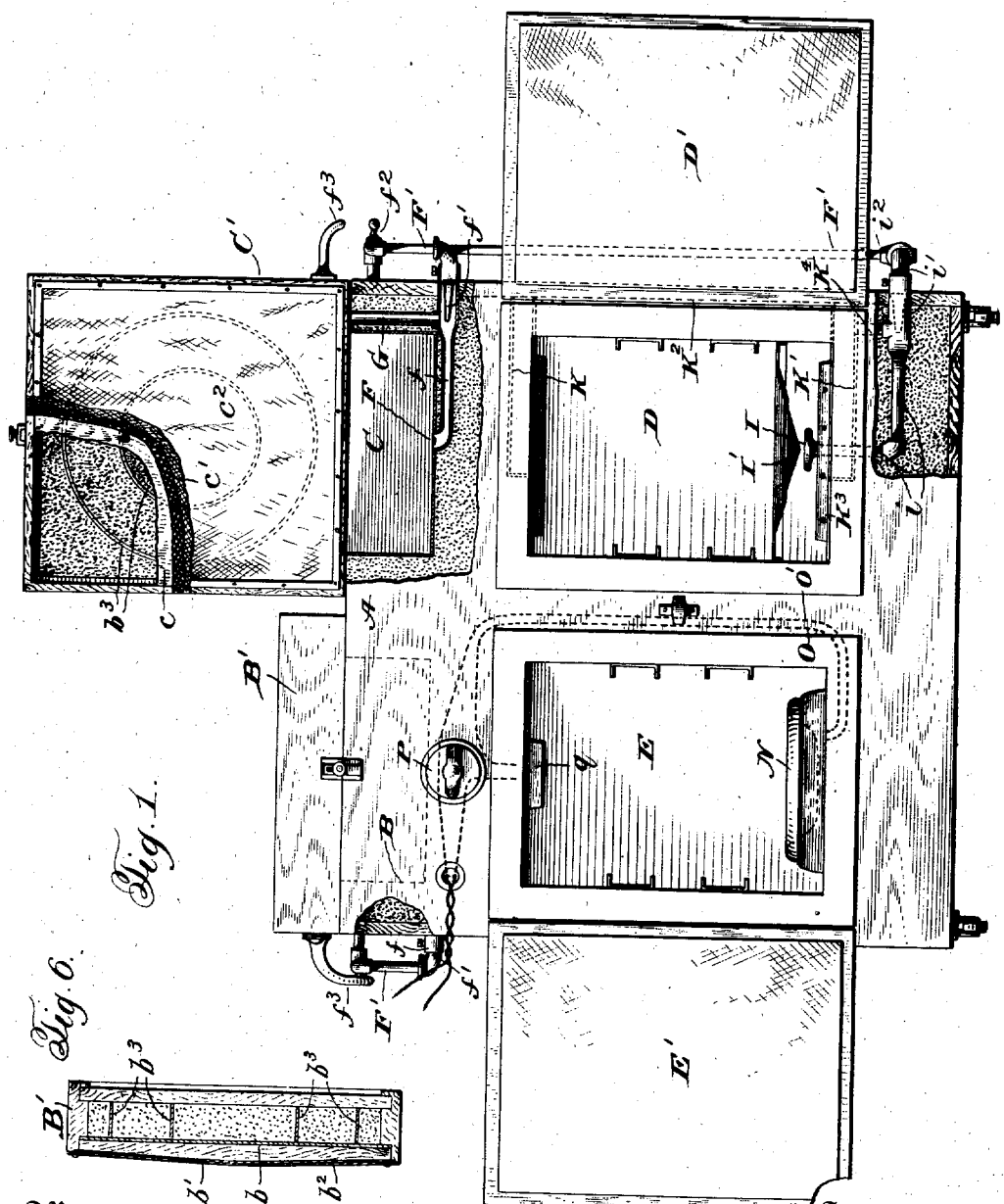

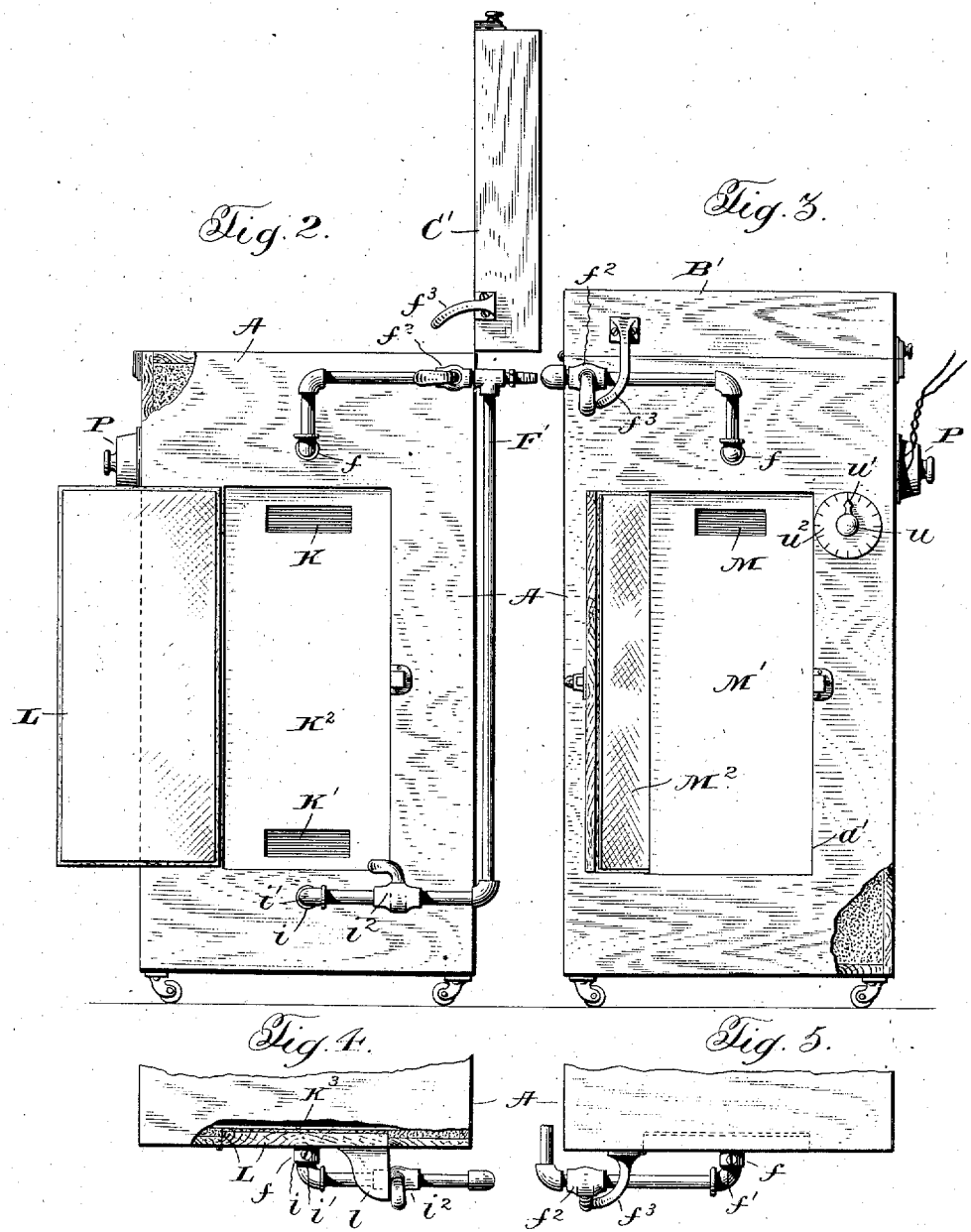

JOHN E. CHAMBERS, OF SHELBYVILLE, INDIANA.

COOK-STOVE.

986,360.   Specification of Letters Patent.   Patented Mar. 7, 1911.

Application filed April 17, 1908. Serial No. 427,563.

*To all whom it may concern:*

Be it known that I, JOHN E. CHAMBERS, a citizen of the United States, residing at Shelbyville, in the county of Shelby and State of Indiana, have invented certain new and useful Improvements in Cook-Stoves, of which the following is a specification, reference being had therein to the accompanying drawing.

This invention relates to an improvement in cooking stoves and the object of the invention is the provision of a stove of this character with which all kinds of cooking may be done with the least consumption of fuel.

A further object of the invention is the provision of a cooking stove in which all of the heat generated is utilized, none of the heat being permitted to escape without coming in contact with the food to be cooked.

A further object of the invention is the provision of a cooking stove of a neat and attractive appearance and of a construction to avoid heating the room in which the same is used.

Other objects of the invention will be apparent from the detailed description hereinafter when read in connection with the accompanying drawings forming a part hereof, wherein a preferable embodiment of my invention is shown and wherein like characters of reference refer to similar parts in the several views.

In the drawings, Figure 1 is a front elevation of my improved cooking stove, parts being shown in section. Fig. 2 is a side elevation of one side of the stove with the lid to the upper compartment in its raised position. Fig. 3 is a side elevation of the opposite side of the stove with the lid to the upper compartment in its lowered position. Fig. 4 is a detail view showing the means employed for preventing passage of fuel to the main cooking compartment when same is rendered air tight. Fig. 5 is a detail view of means employed for preventing passage of fuel to upper compartment when lid is closed. Fig. 6 is a sectional view of one of the lids used to close the upper compartments.

Referring now more particularly to the drawings, A designates the casing of my improved cooking stove which may be of any desired configuration and which is preferably formed of wood or any other poor conductor of heat. Positioned within the casing A are a plurality of cooking compartments which are preferably formed of sheet metal, the space between the outer walls of the several cooking compartments and the inner surfaces of the walls of the casing A being filled with a suitable packing of fireproof material, said packing serving to retain the heat within the cooking compartments, which not only enables the cooking to be done much more economically than with the stoves of ordinary construction but also prevents the kitchen from being heated to an undesirable degree. In the preferred form of my invention the stove is preferably provided with four cooking compartments B, C, D, and E, the compartments B and C being used for broiling, boiling and the like, while the compartments D and E are utilized as ovens. The compartments B and C which are identical in construction are positioned adjacent the top of the casing A and are closed when not in use by means of lids B' and C' which are hinged to the upper portion of the casing A. The lids B' and C' are in the form of bottomless boxes of wood or any other suitable material which is a poor conductor of heat which are filled with suitable packing or heat insulating material, which is retained in place by sheets of strawboard or other suitable material, $b$, $c$, secured in any suitable manner across the lower portions of the lid. Over the outer faces of the sheets $b$, $c$, is a layer of cotton, wool, or other elastic packing which is retained in place by means of cloth sheets $b'$, and $c'$. To protect the cloth sheets $b'$ and $c'$ from injury from steam and grease, detachable covers $b^2$ and $c^2$ are provided which are designed to be detachably secured over the sheets $b'$ and $c'$ in any suitable manner so that they can be removed and replaced when desired. The detachable covers $b^2$ and $c^2$ are preferably provided with an outer surface of asbestos and with an upper surface of any suitable waterproof material.

From the construction above described, it will be noted that each of the lids is provided with a pad on the underside thereof which when the lids are closed will contact with the upper surface of the casing adjacent the upper edges of the cooking compartments B and C, so as to form an air tight fit therewith. To prevent the packing in the lids B' and C' from becoming compressed, spacing rings $b^3$, formed of strawboard or other suitable material, are positioned therein.

Centrally positioned within the lower part of each of the cooking compartments B and C is a burner F, of any suitable construction from which extend fuel pipes $f$, the outer ends of which project for a slight distance without the casing A. Detachably secured in the projecting ends of the pipes $f$ which extend from the burners F in the cooking compartments B and C are conical gas nozzles $f'$, which are connected in any suitable manner to a gas pipe $F'$ which is supported upon the exterior of the casing A and which terminates in a threaded nipple of the usual construction to permit its attachment to the ordinary gas supply pipe. Air is supplied to the burners F by means of pipes G, the lower ends of which connect with the pipes $f$ adjacent the connection of the gas nozzles $f'$ therewith and the upper ends of which terminate flush with the top of the casing A so as to be closed by the lids B' and C' when the same are lowered. From this construction it will be seen that while the lids are in their raised positions air can pass freely to the burners but that when the lids are lowered not only is the air supply to the burners cut off but all of the heat which is in the cooking compartments will be retained therein and prevented from escaping through the air pipes. As the supply of air to the burners F is cut off when the lids are lowered, it is apparent that the burners, if they are allowed to remain lighted, will be extinguished as soon as the lids are lowered and it is therefore important that means should be provided for automatically cutting off the gas supply immediately the lids are lowered, as otherwise should the person using the stove omit to turn off the gas and lower the lid of one of the upper cooking compartments, the flame of the burner would at once be extinguished and any food therein would of course be ruined by the escaping gas. To prevent this the gas pipes which communicate with the nozzles $f$ are provided with suitable valves $f^2$ therein which are of the usual construction and are provided with the usual operating handles, and the lids B' and C' are provided with downwardly projecting fingers $f^3$, which are adapted when the lids are moved to their closed position to engage the operating handles of the valve $f^2$ and move the same to their closed positions. If the valves are already in their closed positions, it is obvious that the handles thereof will not be engaged by the downwardly projecting fingers on the lids when the same are lowered, as in this case the fingers will merely pass in front of the handles of the valve and prevent the manipulation thereof until the lids have again been raised.

Of the two cooking compartments D and E heretofore referred to, one of said compartments, namely, the compartment D, is designed to be heated by gas while the other may be heated by electricity or any other suitable heating medium. The compartment D is in the form of a sheet metal casing the front side of which is open and access is had to said compartment through an opening which is formed in the front of the casing A and which is adapted to be closed by a door D' hinged thereto. The door D' is in the form of a bottomless box of wood or other suitable material and is filled with a packing of non-conducting material which is retained therein by a metal panel which is secured across the open face thereof, the edges of said metal panel being inturned and secured in any suitable manner to the edges of the wooden door. The portion of the casing A surrounding the door opening therein is provided with a facing of sheet metal against which the door D' abuts when closed, so that no part of the wood casing will be subjected to the action of heat when the door is closed.

I designates a burner of any suitable construction which is supported centrally of the lowermost portion of the cooking compartment D and from which extends a pipe $i$, the outer end of which projects for a slight distance without the casing A and has threaded or otherwise removably secured therein a conical gas nozzle $i'$ which is connected by a suitable branch pipe to the gas pipe F' heretofore described, a suitable valve $i^2$ being positioned in the pipe $i'$ to control the flow of gas to the burner I. Secured within the cooking compartment D and directly over the burner I therein, is a heat spreader I' which is preferably in the form of an inverted cone.

The cooking compartment D is provided at the top and bottom thereof with air tubes K and K', the inner ends of which communicate with the central portions of the top and bottom of the cooking compartment while the outer ends thereof pass through and are secured to a sheet metal plate $K^2$ which is secured to the interior of the side wall of the casing A across an opening $a'$ which is formed therein. Secured to the bottom of the cooking department D and overlying the inlet end of the lower air tube K' is a shield $K^3$ which is provided with openings at the ends thereof so that the air in entering the oven will not be permitted to come into direct contact with the burner. A similar shield is secured to the top of the cooking compartment so as to overlie the lower end of the upper air tube K which acts as a vent for the oven. This shield insures an even distribution of heat to the ends and corners of the oven. The necessary air is supplied to the burner I to produce a proper combustible mixture by means of a pipe $K^4$ which connects the lower air tube K' with the tube $i$ which extends from the burner, adjacent the connection of the gas nozzle $i'$ therewith. As the pipe $K^4$ connects with the lowermost air pipe K' inside of the casing A, it will be apparent that when the inlet ends of the air pipes K and K' are closed there is no communication whatev_ between the interior of the oven and the outer air, so that any heat in the oven will be retained there for a considerable period of time and the cooking may be carried on after the burner has been extinguished, thereby effecting a considerable saving in the amount of fuel which is consumed.

To close the inlet ends of the air pipe K and K', a damper in the form of a door L is provided. The door L is hingedly connected to the side wall of the casing A and is designed when closed to completely fill the opening $a'$ therein and to fit tightly against the outer surface of the sheet metal plate $K^2$ which extends thereacross. The door L is preferably formed of wood and the inner surface thereof is preferably provided with a facing of asbestos or other nonconducting material, to prevent heating thereof when closed. Projecting laterally from the front side of the door L is a member $l$ which is designed when the door is in its closed position to lie alongside of the handle of the gas valve $i^2$, when said valve is in its closed position, so as to prevent the valve being turned to an open position to permit gas to pass to the burner I while the door is in its closed position. From this construction it is obvious that if the gas to the burner is turned off the door L may be readily closed and the gas cannot thereafter be turned on until the door is open, and it is also obvious that if the gas is turned on to the burner the door cannot be closed until the same has been cut off, so that in no case is it possible for gas to flow to the burner while the door L is in its closed position.

It will be noted that all of the cooking compartments of the stove may be closed so as to exclude all air therefrom and as all of the compartments are surrounded by a heavy covering of non-conducting material, it will be apparent that any heat therein may be retained for a long period of time, so that in cooking it is only necessary to utilize the burner or heater for a comparatively short time until the compartment is thoroughly heated, after which time the heater or burner may be dispensed with and the cooking carried on without the use thereof, thereby effecting a considerable saving in the cost of fuel. It will also be noted that from the construction of the stove there will be no heating of the kitchen or other room when the same is used.

I do not desire to limit myself to the precise form and construction shown in the drawings, as it is obvious that many minor changes may be made thereto without departing from the spirit of the invention as defined in the appended claims.

What I claim is:

1. In a stove, a casing, a cooking compartment therein, a door affording access to said compartment, a burner for said compartment, a fuel pipe leading to said burner, a valve for said fuel pipe positioned outside of the casing, an air pipe communicating with the burner, means independent of the compartment door for closing said air pipe, and means preventing manipulation of the fuel valve when said air pipe is closed.

2. In a stove, a casing, a cooking compartment therein, a door affording access to said compartment, a burner for said compartment, a fuel pipe leading to said burner, a valve for said fuel pipe positioned outside of the casing, an air pipe communicating with the burner, a door independent of the compartment door for closing said air pipe, and means preventing the manipulation of the fuel valve when said door is in its closed position.

3. In a stove, a casing, a cooking compartment therein, a door affording access to said compartment, a burner for said compartment, a fuel pipe leading to said burner, a valve for said fuel pipe positioned outside of the casing, an air pipe communicating with the burner, an independent door for closing said air pipe, and means carried by said door and arranged to lie in the path of movement of the fuel valve to prevent manipulation thereof when the door is closed.

4. In a fireless cooker, a heat insulated cooking compartment, a burner therein, a fuel pipe leading to said burner, a valve for said pipe provided with an operating handle, an air pipe leading direct to said burner, a door adapted when closed to directly overlie the inlet opening of said pipe and cut off the passage of air to said burner, and means carried by said door and adapted when the door is closed to lie in the path of the handle of said valve and prevent manipulation thereof while the air pipe is closed.

5. In a stove, a casing, a cooking compartment therein, a door affording access to said compartment, a burner for said compartment, a fuel pipe leading to said burner, a valve for said pipe provided with an operating handle, an air pipe leading to the burner, a closure for said pipe, and means carried thereby adapted to lie in the path of the handle of said valve when the air pipe is closed to prevent the opening of the fuel valve.

6. In a fireless cooker, a heat insulated cooking compartment, a burner within said compartment, a door affording access to said compartment, air passages leading from the exterior of the casing to the upper and lower portions of said cooking compartment, and a separate and independent door for closing said air passages.

7. In a fireless cooker, a heat insulated cooking compartment, a burner within said compartment a door affording access to said compartment, air passages leading from the exterior of the casing to the upper and lower portions of the cooking compartment, a connection between one of said air passages and the burner, and a separate and independent door for closing said air passages.

8. In a stove, a casing, a cooking compartment therein, a burner therefore, a fuel pipe leading from the exterior of the casing to the burner, air passages leading from the exterior of the casing to the upper and lower portions of said compartment a connection between one of said passages and the fuel pipe within the casing, and a door for closing said air passages.

9. In a stove, a casing, a cooking compartment therein, a burner therefor, a fuel pipe leading from the exterior of the casing to the burner, a valve in said fuel pipe, air passages leading from the exterior of the casing to the upper and lower portions of said compartment, a connection between one of said passages and the fuel pipe, a door adapted to close said air passages, and means preventing the manipulation of the fuel valve when the door is closed.

10. In a stove, a casing, a cooking compartment therein a burner therefor, a fuel pipe leading from the exterior of the casing to the burner, a valve in said fuel pipe, air passages leading from the exterior of the casing to the upper and lower portions of said compartment, a connection between one of said air passages and the fuel pipe, a door adapted to close said air passages, and means carried by said door and arranged to lie in the path of the handle of the fuel valve when the door is closed.

11. In a fireless cooker, an air tight heat insulated cooking compartment provided with a draft opening, a door affording access to said compartment, a burner in said compartment, means independent of the compartment door for closing said draft opening, and means preventing the passage of fuel to the burner when said draft opening is closed.

12. In a fireless cooker, an air tight heat insulated cooking compartment provided with draft and vent openings, a burner in said cooking compartment a door affording access to the compartment, means independent of the compartment door for closing said draft and vent openings, and means for preventing the passage of fuel to the burner when the draft and vent openings are closed.

13. A combined gas stove and fireless cooker comprising a cooking compartment provided with a door affording access thereto and with an opening therein leading to the exterior thereof, a burner in said compartment, a fuel valve controlling the passage of fuel to said burner, a damper for the opening in the cooking compartment, and means coöperating with said valve to hold the same in a position to prevent passage of fuel to the burner when the damper is closed and permitting free actuation of said valve when the damper is in open position.

In testimony whereof I affix my signature in presence of two witnesses.

JOHN E. CHAMBERS.

Witnesses:
W. E. TINDALL,
E. H. D. YOUNG.